H. Stollar,
Evaporator.
No. 89,951.  Patented May 11, 1869.
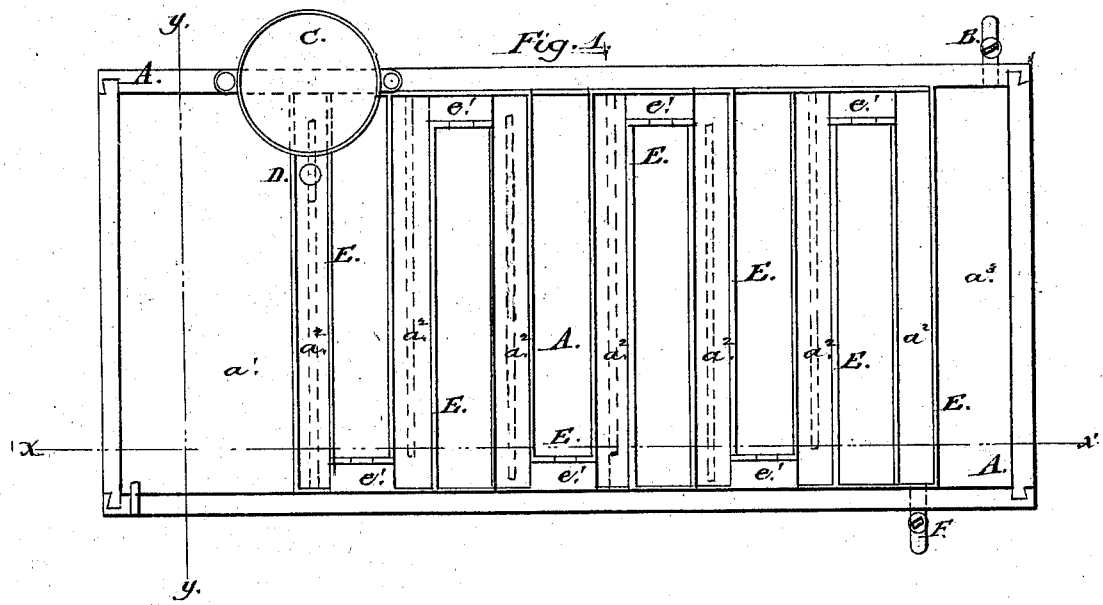
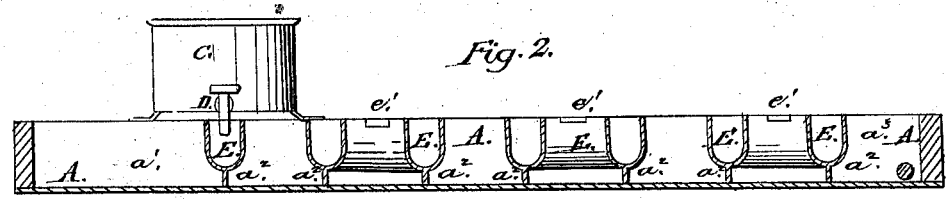
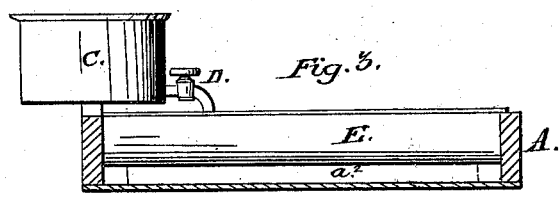
Witnesses:
John F. Brooks
Wm. F. Clark
Inventor:
H. Stollar
per Munn
attorney

UNITED STATES PATENT OFFICE.

HENRY STOLLAR, OF WATERTOWN, OHIO.

IMPROVED EVAPORATOR.

Specification forming part of Letters Patent No. 89,951, dated May 11, 1869.

*To all whom it may concern:*

Be it known that I, HENRY STOLLAR, of Watertown, in the county of Washington and State of Ohio, have invented a new and useful Improvement in Evaporators; and I do hereby declare that the following is a full, clear, and exact description thereof, which will enable others skilled in the art to make and use the same, reference being had to the accompanying drawing, forming part of this specification, and in which—

Figure 1 is a top view of my improved evaporator. Fig. 2 is a vertical longitudinal section of the same taken through the line $x\,x$, Fig. 1. Fig. 3 is a vertical cross-section of the same, taken through the line $y\,y$, Fig. 1.

Similar letters of reference indicate corresponding parts.

My invention has for its object to furnish an improved evaporator, designed especially for evaporating sorghum-juice, but equally applicable for evaporating other saccharine juices, which shall be so constructed and arranged that the sirup may be "finished" by the heat of the evaporating juice, in such a way that it may be impossible for the said sirup to be scorched or burned during the operation; and it consists in the construction and combination of the various parts of the evaporator, as hereinafter more fully described.

A represents the main pan of the evaporator. into the forward compartment, $a^1$, of which the juice to be evaporated is introduced.

The pan A is divided into various compartments by low transverse partitions $a^2$, extending almost across the pan, a narrow space being left at the opposite end of each partition $a^2$, so as to form a zigzag channel from the compartment $a^1$, into which the juice is introduced, to the compartment $a^3$, from which the sirup is drawn off through the stop-cock B.

When the sirup is drawn off it is placed in the receiver C, attached to the pan A, near its forward end, from which it passes through the stop-cock D to the trough E, said stop-cock allowing the flow of the sirup to be regulated or interrupted at will.

The trough E crosses the pan A above each partition $a^2$, and passes from partition to partition, along the sides of the said pan A alternately, so that the said trough may be continuous from the first partition at the front end to the last partition at the rear end of the said pan, where the finished sirup or molasses is drawn off through the stop-cock F.

The parts of the trough E that pass along the sides of the pan A should be protected with hinged or removable covers $e^1$, which may be shut down over or placed upon the said parts, to prevent the scum and drip of the sirup from dropping into the trough E when skimming or removing the scum from the said pan A. By this construction the sirup is evaporated or finished by the heat from the juice or sirup in the pan A, so as not to require another fire, and at the same time in such a way that it may be impossible for the sirup to be scorched or burned while being finished.

Having described my invention, what I claim as new, and desire to secure by Letters Patent, is—

An improved evaporator, formed by the combination of the main pan A, partitions $a^2$, and trough E with each other, said parts being constructed and arranged substantially as herein shown and described, and for the purposes set forth.

HENRY STOLLAR.

Witnesses:
 THOMAS LAMSDON,
 J. C. PRESTON.